(12) United States Patent
Jonsson

(10) Patent No.: US 12,202,386 B2
(45) Date of Patent: Jan. 21, 2025

(54) SEAT RAIL SYSTEM FOR A VEHICLE AND A VEHICLE COMPRISING A SEAT RAIL SYSTEM

(71) Applicants: Ningbo Geely Automobile Research & Development Co., Ltd., Ningbo (CN); Zhejiang Geely Holding Group Co., Ltd., Zhejiang (CN)

(72) Inventor: Tony Jonsson, Alingsås (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/378,464

(22) Filed: Oct. 10, 2023

(65) Prior Publication Data
US 2024/0042902 A1 Feb. 8, 2024

Related U.S. Application Data

(63) Continuation of application No. PCT/CN2022/086609, filed on Apr. 13, 2022.

(30) Foreign Application Priority Data

Apr. 28, 2021 (EP) ...................................... 21171051

(51) Int. Cl.
*B60N 2/07* (2006.01)
*B60N 2/427* (2006.01)

(52) U.S. Cl.
CPC ........... *B60N 2/0715* (2013.01); *B60N 2/073* (2013.01); *B60N 2/42709* (2013.01); *B60N 2/0732* (2013.01)

(58) Field of Classification Search
CPC ... B60N 2/0715; B60N 2/073; B60N 2/42709
See application file for complete search history.

(56) References Cited

U.S. PATENT DOCUMENTS 5,454,541 A 10/1995 Ito
5,961,089 A * 10/1999 Soisnard .............. B60N 2/0715
296/68.1

(Continued)

FOREIGN PATENT DOCUMENTS

CN 1749066 A 3/2006
CN 102398535 A 4/2012

(Continued)

OTHER PUBLICATIONS

International Search Report from corresponding International Application No. PCT/CN2022/086609, mailed on Jun. 27, 2022, 2 pages.

*Primary Examiner* — Anita M King
(74) *Attorney, Agent, or Firm* — Tucker Ellis LLP

(57) ABSTRACT

A seat rail system for a vehicle includes an upper rail and a stationary lower rail attached to a floor structure. The upper rail is attached to a vehicle seat and is movable relative to the lower rail. The upper rail comprises first and second side sections with a cavity between the side sections. The lower rail includes first and second lateral side elements respectively connected to the first and second side sections. An elongated load member is attached to the lower rail, where an upper part of which extends into the cavity. A lower part of the load member is connected to the floor structure. The first lateral side element blocks lateral movement of the first side section and the second lateral side element blocks lateral movement of the second side section upon deformation of the upper rail in a vehicle impact event.

15 Claims, 8 Drawing Sheets

(56) References Cited

U.S. PATENT DOCUMENTS

| | | | |
|---|---|---|---|
| 7,309,107 B2 * | 12/2007 | Smith | B60N 2/073 297/344.11 |
| 9,126,505 B2 * | 9/2015 | Moriyama | B60N 2/0722 |
| 11,964,594 B2 * | 4/2024 | Mun | B60N 2/0715 |
| 2004/0124683 A1 | 7/2004 | Matsumoto | |
| 2005/0230591 A1 | 10/2005 | Smith | |
| 2009/0102224 A1 | 4/2009 | Rohee | |
| 2010/0327138 A1 | 12/2010 | Yamada | |
| 2013/0020459 A1 | 1/2013 | Moriyama | |
| 2020/0282868 A1 * | 9/2020 | Komiyama | B60N 2/02253 |
| 2024/0034206 A1 * | 2/2024 | Jonsson | B60N 2/0735 |

FOREIGN PATENT DOCUMENTS

| | | |
|---|---|---|
| CN | 110901478 A | 3/2020 |
| CN | 111717087 A | 9/2020 |
| CN | 111942238 A | 11/2020 |
| DE | 10210555 A1 | 10/2003 |
| FR | 2728203 A1 | 6/1996 |
| FR | 2891776 A1 | 4/2007 |
| JP | 2015003593 A | 1/2015 |
| WO | 2018011053 A1 | 1/2018 |
| WO | 2021043071 A1 | 3/2021 |

* cited by examiner

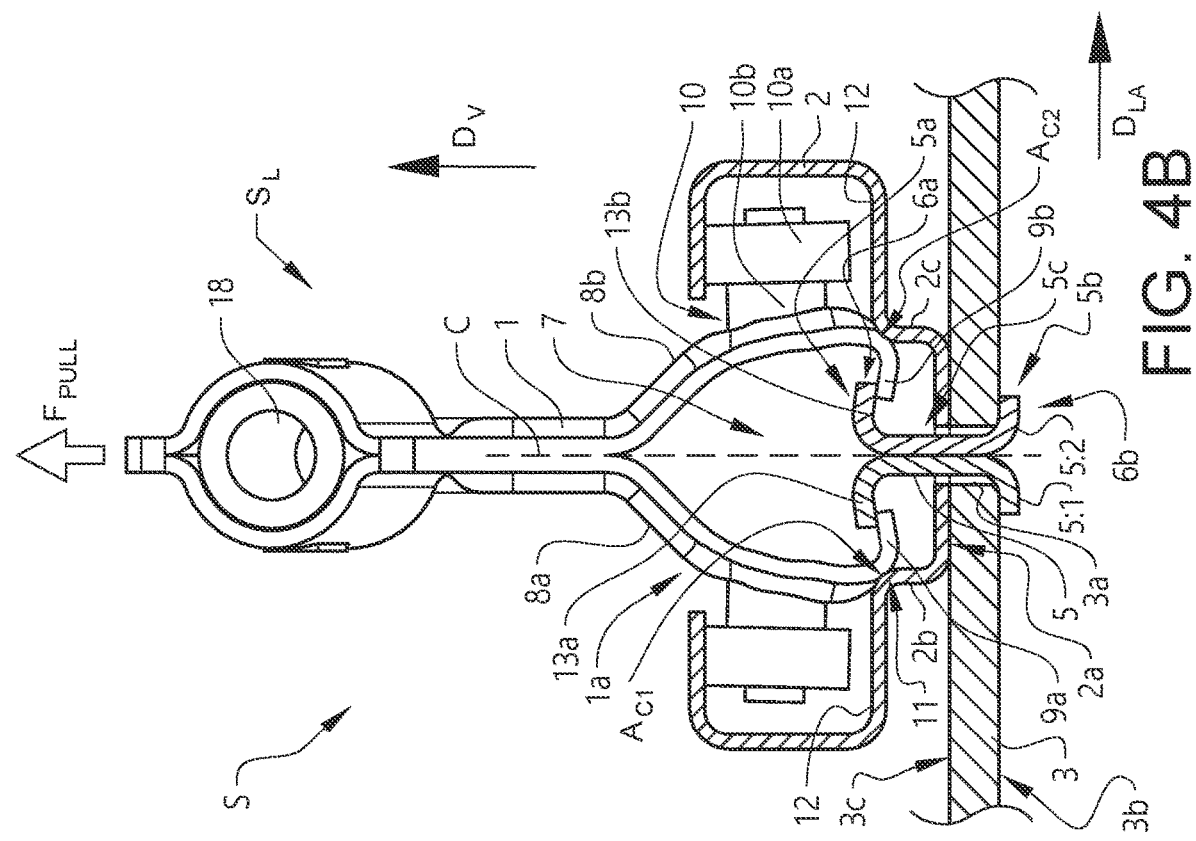
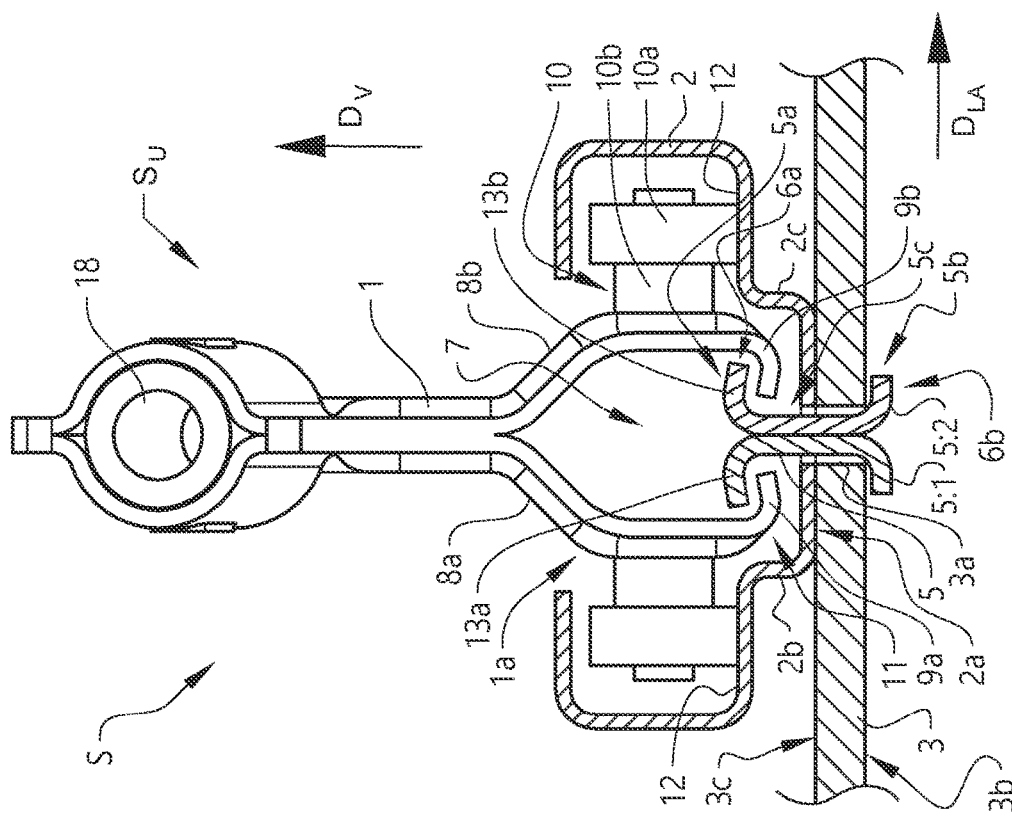
FIG. 4A
FIG. 4B

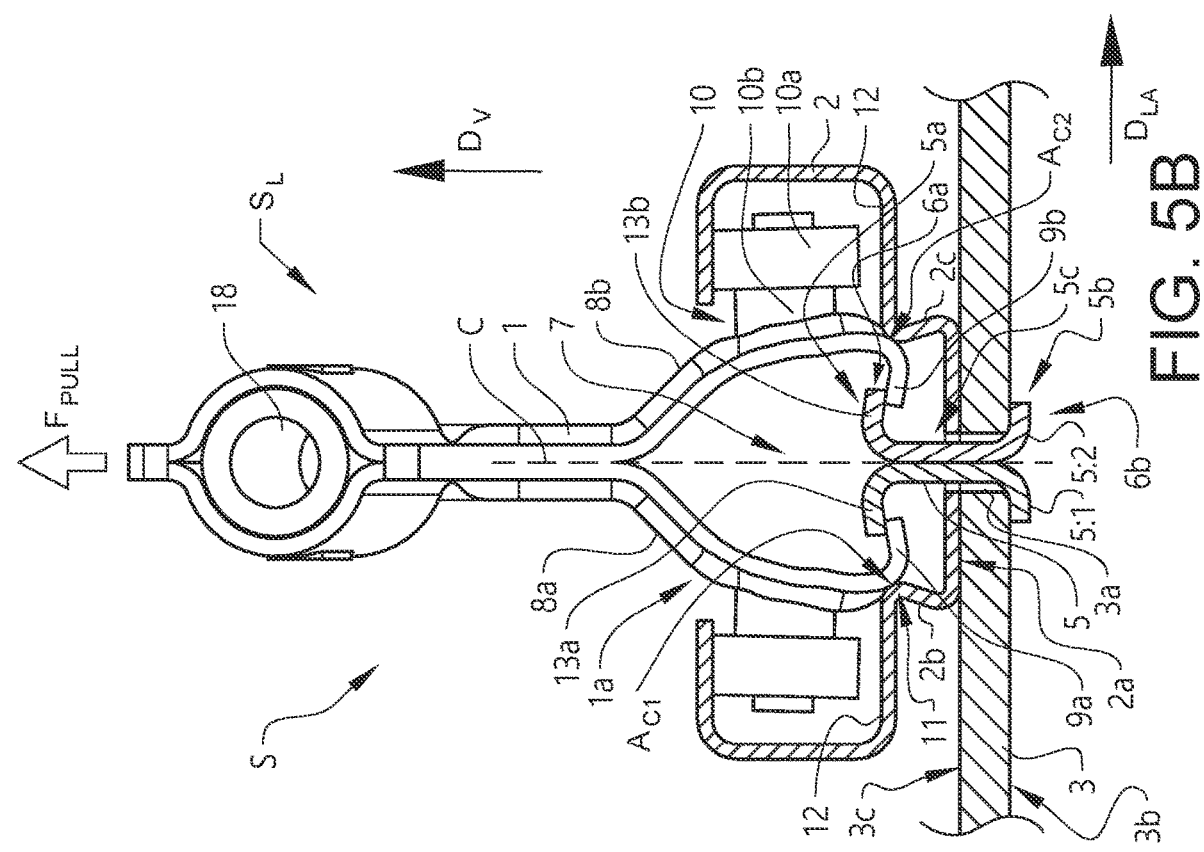
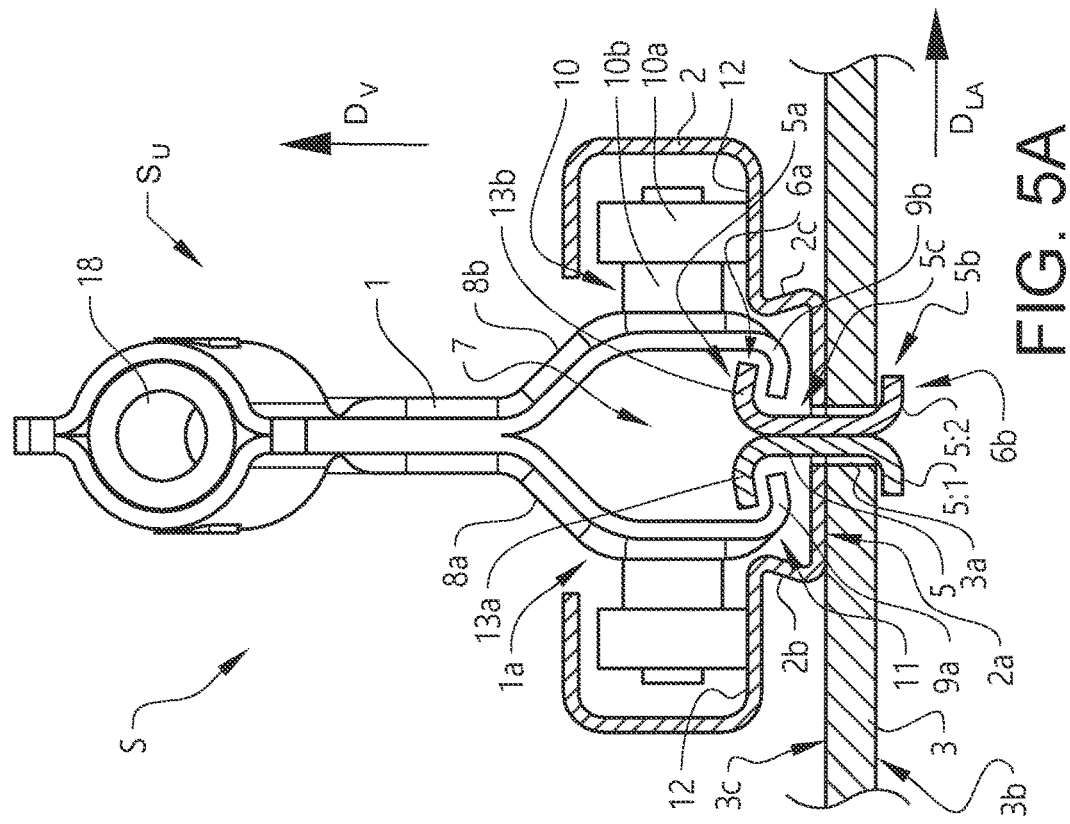

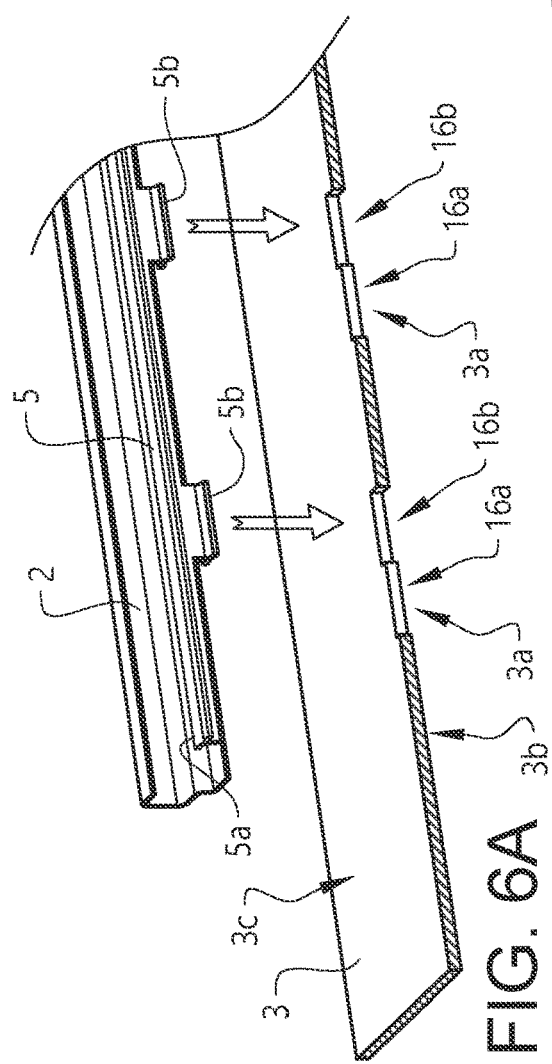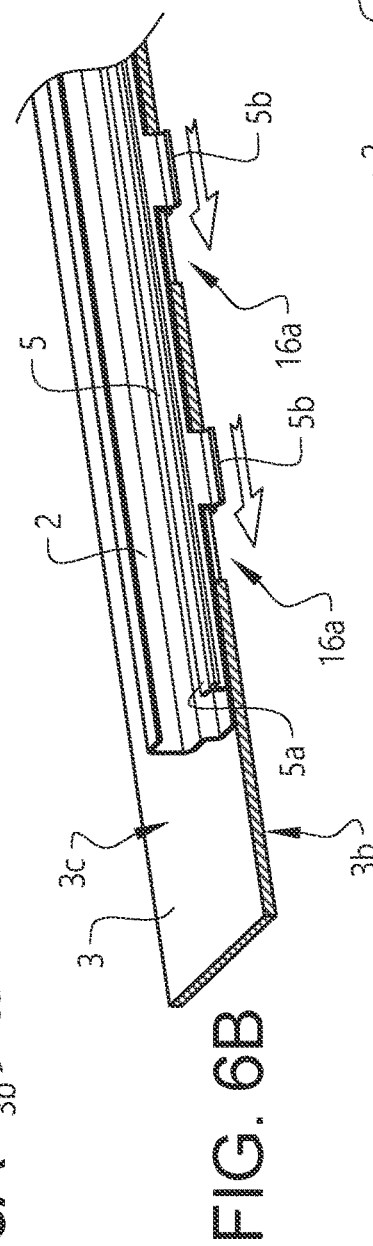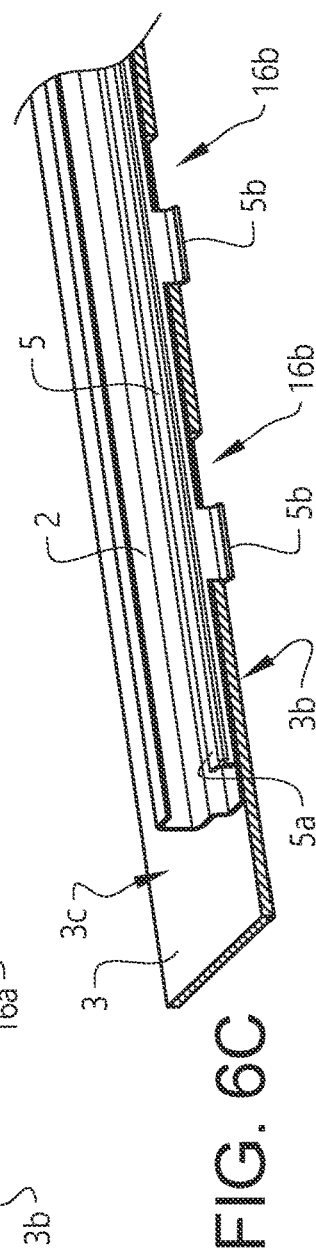

SEAT RAIL SYSTEM FOR A VEHICLE AND A VEHICLE COMPRISING A SEAT RAIL SYSTEM

RELATED APPLICATION DATA

This application is a continuation of International Patent Application No. PCT/CN2022/086609, filed Apr. 13, 2022, which claims the benefit of European Patent Application No. 21171051.2, filed Apr. 28, 2021, the disclosures of which are incorporated herein by reference in their entireties.

TECHNICAL FIELD

The present disclosure relates to a seat rail system for vehicles. The seat rail system comprises an upper rail and a stationary lower rail attached to a floor structure of the vehicle. The upper rail is configured for being attached to a vehicle seat and the upper rail is movably arranged in relation to the lower rail in a longitudinal vehicle direction. The disclosure further relates to a vehicle comprising a seat rail system.

BACKGROUND

Vehicle seats are commonly arranged with a seat rail system for a mechanical sliding connection between the vehicle seat and a floor structure of the vehicle. Conventional seat rail systems comprise a pair of two interconnected rails that are linearly slidable relative to each other, where a lower rail is stationary attached to the floor structure and an upper rail is fastened to the vehicle seat. With the seat rail systems, the vehicle seat is adjustable in a longitudinal vehicle direction for a convenient positioning of the vehicle seat. Traditional seat rail systems commonly have complex load paths from the floor structure to the vehicle seat, which is negative when the seat rail system is exerted to forces in a vehicle impact event. The complex load paths are resulting in heavy and costly constructions of the seat rail systems to achieve desired performance. This is especially of concern if the vehicles are equipped with vehicle seats having integral seat belt systems only connected to the vehicle seats, where all impact forces need to be absorbed by the vehicle seat construction.

There is thus a need for an improved seat rail system having the ability to absorb load in vehicle impact events efficiently for improved safety of vehicle occupants, where the seat rail system is fulfilling legal requirements, is lightweight in construction, and is having a low cost design.

SUMMARY

An object of the present disclosure is to provide a seat rail system for vehicles and a vehicle comprising a seat rail system, where the previously mentioned problems are avoided. This object is at least partly achieved by the features of the independent claims. The dependent claims contain further developments of the seat rail system.

The disclosure concerns a seat rail system for a vehicle. The seat rail system comprises an upper rail and a stationary lower rail attached to a floor structure of the vehicle. The upper rail is configured for being attached to a vehicle seat and the upper rail is movably arranged in relation to the lower rail in a longitudinal vehicle direction. The upper rail comprises a first side section and a second side section. A cavity is formed between the first side section and the second side section in a lower portion. The lower rail comprises a first lateral side element arranged in connection to and in an overlapping relationship to the first side section, and a second lateral side element arranged in connection to and in an overlapping relationship to the second side section. The seat rail system further comprises an elongated load member attached to the lower rail, where an upper part of the load member is extending into the cavity. One or more lower parts of the load member are connected to the floor structure. The first lateral side element is configured for blocking lateral movement of the first side section and the second lateral side element is configured for blocking lateral movement of the second side section upon deformation of the upper rail in a vehicle impact event.

Advantages with these features are that the load path from the floor structure to the upper rail via the load member is preventing large deformations of the rails through the anchoring of the upper rail to the floor structure via the load member, and through the blocking of the lateral movements by the lateral side elements. The simple and efficient construction of the seat rail system with the load member and the lateral side elements is providing a straight symmetrical load path all the way from the floor structure to the vehicle seat via the upper rail, allowing a compact construction of the system with low height and low weight at a low cost. Through the interaction between the floor structure and the upper rail via the load member, forces are efficiently built up in the system in the vehicle impact event for a high system stiffness that is preventing large deformations, where the ability of the system to absorb loads in the vehicle impact event efficiently is increasing the safety of vehicle occupants.

According to an aspect of the disclosure, one or more lower parts of the load member are extending through the floor structure. The load member is configured for being directly in engagement with the floor structure and the lower portion in the vehicle impact event for establishing a load path from the floor structure to the upper rail via the load member. With the load member connected to both the floor structure and to the lower portion, the seat rail system has the ability to absorb loads efficiently in the vehicle impact event for increased safety of the vehicle occupants.

According to another aspect of the disclosure, the lower portion of the upper rail has a bell-shaped cross-sectional configuration forming the cavity between the first side section and the second side section. The cavity is configured for embracing the upper part. The cavity is arranged around the upper part of the load member for a simple and robust connection between the lower portion and the load member. The cavity is further allowing a longitudinal displacement of the upper rail in relation to the lower rail in normal operating conditions for positioning the vehicle seat, without any interaction between the load member and the lower portion.

According to an aspect of the disclosure, the upper part of the load member has an upper T-shaped cross-sectional configuration with a laterally extending upper flange. The upper flange comprises a first flange section and a second flange section laterally extending on opposite sides of a web section. The first side section comprises a lateral inwardly projecting first flange and the second side section comprises a lateral inwardly projecting second flange. The first flange is arranged below the first flange section and configured for being in engagement with the first flange section in the vehicle impact event. The second flange is arranged below the second flange section and configured for being in engagement with the second flange section in the vehicle impact event. The upper flange with the first flange section and the second flange section is configured for being in engagement with the first flange and the second flange of the lower portion of the upper rail in the vehicle impact event. The upper flange is efficiently engaging the lower portion of the upper rail in the vehicle impact event for a secure and strong connection between the load member and the upper rail. The secure connection is preventing that the upper rail is separated from the lower rail in the vehicle impact event.

According to another aspect of the disclosure, the first flange is extending inwards towards the load member from the first side section with an upwards inclined configuration. The second flange is extending inwards towards the load member from the second side section with an upwards inclined configuration. The upwards inclined configurations of the first flange and the second flange are securing a strong attachment to the load member.

According to a further aspect of the disclosure, the first flange section is extending outwards towards the first side section from the web section with a downwards inclined configuration. The second flange section is extending outwards towards the second side section from the web section with a downwards inclined configuration. The downwards inclined configurations of the first flange section and the second flange section are securing a strong attachment to the first flange and the second flange of the upper rail.

According to an aspect of the disclosure, the first flange section has an extension parallel to, or essentially parallel to, the extension of the first flange in an unloaded state. The second flange section has an extension parallel to, or essentially parallel to, the extension of the second flange in the unloaded state. The parallel extensions are securing a robust and efficient engagement between the parts when the upper rail is displaced from the unloaded state to a loaded state in the vehicle impact event.

According to another aspect of the disclosure, the lower rail comprises a lower section. The one or more lower parts of the load member are extending through the lower section. The first lateral side element and the second lateral side element are extending upwards from the lower section on opposite sides of the load member. In this way, the load member can be connected to the lower rail for forming a strong construction. The load member is with this configuration forming a part of the lower rail that is simplifying the assembling of the system. The extension of the lateral side elements on opposite side of the load member is enabling a compact and robust construction of the system.

According to a further aspect of the disclosure, the first lateral side element is extending from the lower section towards the load member with an inwards inclined configuration. The second lateral side element is extending from the lower section towards the load member with an inwards inclined configuration. The inwards inclined configurations of the lateral side elements are providing an increased system strength.

According to an aspect of the disclosure, the one or more lower parts of the load member are extending though corresponding openings of the floor structure. The extension of the lower parts through the openings is securing a firm engagement between the load member and the floor structure in the vehicle impact event. The openings are further simplifying the mounting of the lower rail to the floor structure.

According to another aspect of the disclosure, the one or more lower parts of the load member are configured for being in engagement with a lower surface of the floor structure in the vehicle impact event. The lower surface is absorbing the forces occurring in the vehicle impact event, and the floor structure is of a strong and robust construction. The engagement of the lower parts and the floor structure is securing that the lower rail is not separated from the floor structure in the vehicle impact event.

According to a further aspect of the disclosure, the one or more lower parts of the load member have lower T-shaped cross-sectional configurations with a laterally extending lower flange. The lower flange is configured for being in engagement with the floor structure in the vehicle impact event. The lower flange is efficiently engaging the floor structure in the vehicle impact event for a secure and strong connection between the load member and the floor structure. The secure connection through the lower flange is preventing that the lower rail is separated from the floor structure in the vehicle impact event.

According to an aspect of the disclosure, the seat rail system further comprises laterally extending bearing structures, where the bearing structures are attached to the upper rail and extending in opposite directions from the upper rail. The bearing structures are configured for movably engaging the lower rail. The bearing structures are providing a low-friction movable engagement between the upper rail and the lower rail. The bearing structures comprise bearings, and the lower rail comprises bearing surfaces laterally arranged on opposite sides of the load member. The bearings and the bearing surfaces are configured for interacting with each other when the upper rail is displaced in relation to the lower rail. The bearings may for example be roller bearings and the roller bearings may be provided with wheel elements or similar structures for rolling interaction with the bearing surfaces upon longitudinal displacement of the upper rail in relation to the lower rail. The bearings may alternatively be sliding bearings for sliding interaction with the bearing surfaces upon longitudinal displacement of the upper rail in relation to the lower rail.

According to another aspect of the disclosure, the floor structure is an integrated structural part of a body-in-white structure of the vehicle. With the integrated floor structure, a strong construction of the system is achieved for efficiently absorbing loads in the vehicle impact event.

The disclosure further concerns a vehicle comprising the seat rail system.

BRIEF DESCRIPTION OF THE DRAWINGS

The disclosure will be described in detail in the following, with reference to the attached drawings, in which FIGS. 4A-4B show schematically, in cross-sectional front views, the seat rail system in an unloaded state and in a loaded state, according to the disclosure, FIGS. 5A-5B show schematically, in cross-sectional front views, the seat rail system in an unloaded state and in a loaded state, according to an alternative embodiment of the disclosure, FIGS. 6A-6C show schematically, in perspective views from above, the lower rail of the seat rail system in different mounting positions in relation to the floor structure, according to the disclosure.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
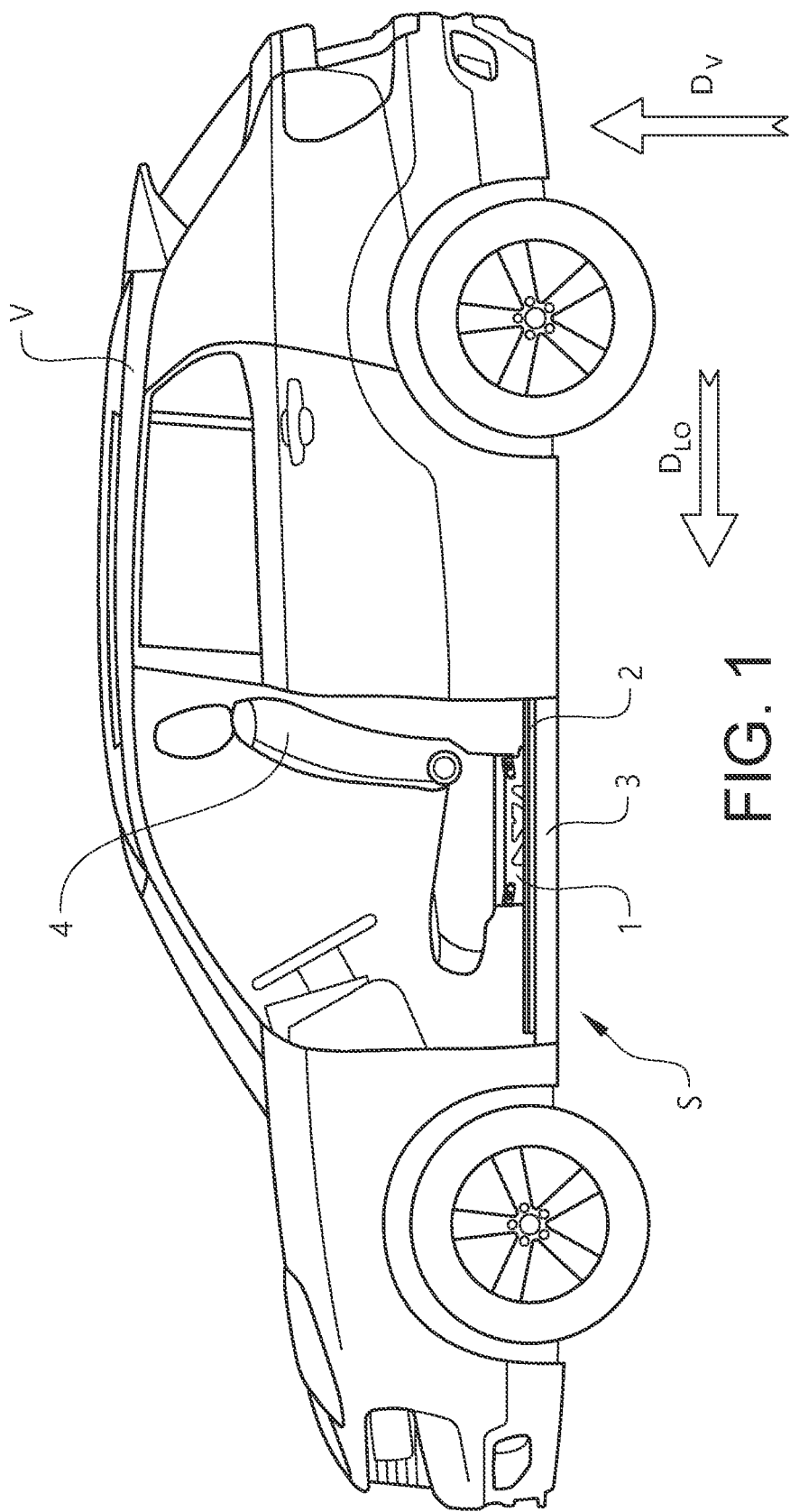
FIG. 1 shows schematically, in a side view, a vehicle with a seat rail system having an upper rail attached to a vehicle seat and a lower rail attached to a floor structure, according to the disclosure.

FIG. 1 schematically shows a vehicle V with a seat rail system S. The seat rail system S comprises an upper rail 1 and a stationary lower rail 2 having an extension in a longitudinal vehicle direction $D_{LO}$, as illustrated in FIGS. 1-3, 4A-4B, 5A-5B, and 8. The lower rail 2 is attached to a floor structure 3 of the vehicle V, and the upper rail 1 is attached to a vehicle seat 4. The upper rail 1 is movably arranged in relation to the lower rail 2 in the longitudinal vehicle direction $D_{LO}$, as indicated with the double arrow in FIG. 2, for a convenient adjustment and positioning of the vehicle seat 4 in relation to the floor structure 3. A lower base surface of the lower rail 2 is positioned in connection to an upper surface 3c of the floor structure 3. The seat rail system S may be provided with suitable vehicle seat positioning and locking arrangements for positioning of the upper rail 1 in relation to the lower rail 2. The floor structure 3 is forming part of the seat rail system S, as will be further described below. Usually, two parallel seat rail systems S are used for holding one vehicle seat 4. In FIG. 1, the seat rail system S is illustrated in connection to a front vehicle seat 4, but the seat rail system S may be used also for other adjustable vehicle seats.

A lateral vehicle direction $D_{LA}$ is defined as a direction perpendicular to the longitudinal vehicle direction $D_{LO}$. The expressions upper, lower, upwards, and downwards, used in this context are referring to directions in relation to the seat rail system S when installed in the vehicle V in the position illustrated in FIG. 1, and refers to positions or relative positioning in a vertical vehicle direction $D_V$.

Figure 2:
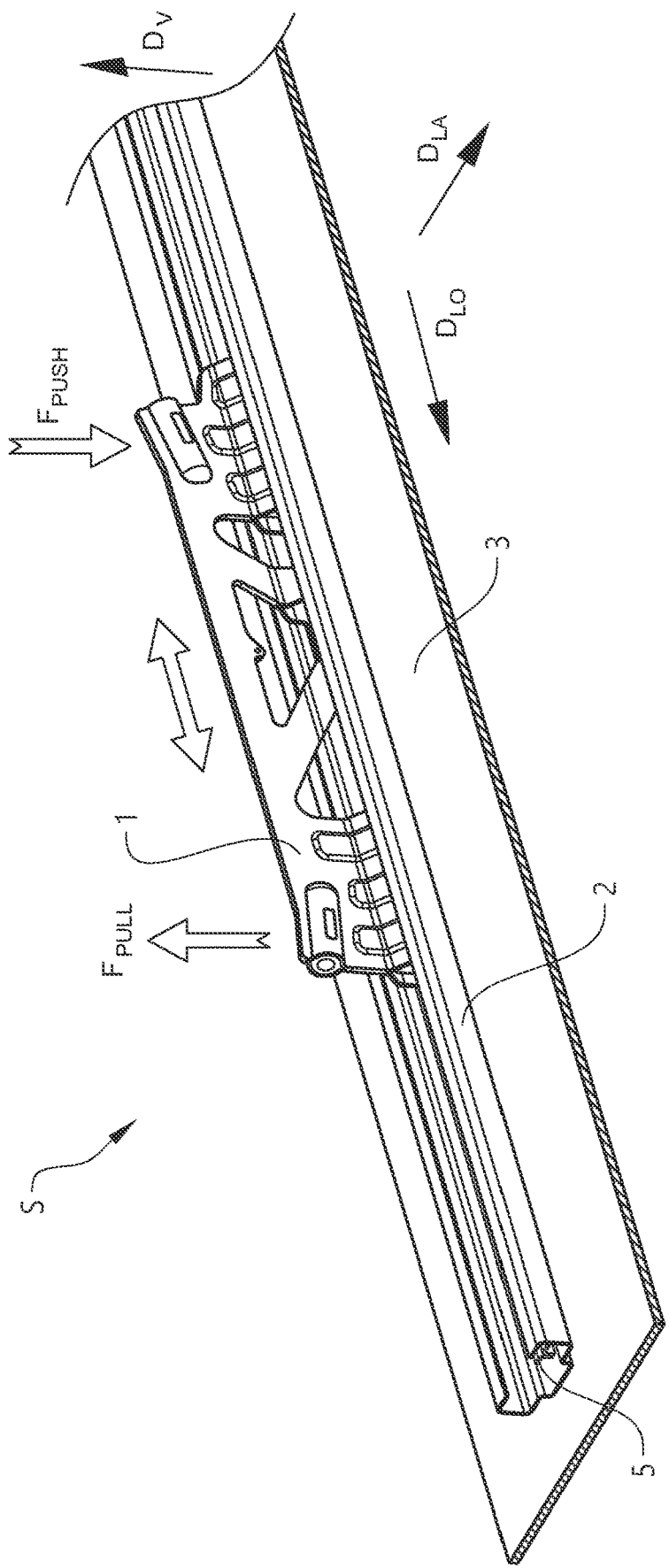
FIG. 2 shows schematically, in a perspective view from above, the seat rail system, according to the disclosure.

The floor structure 3 is suitably an integrated structural part of a body-in-white structure of the vehicle V having an extension in the longitudinal vehicle direction $D_{LO}$ and lateral vehicle direction $D_{LO}$, or essentially in the longitudinal vehicle direction $D_{LO}$ and lateral vehicle direction $D_{LO}$, as indicated in for example FIG. 2. With a body-in-white structure of the vehicle V is meant a car body construction in which the car body's sheet metal components have been welded together, where any moving parts, the motor or engine, the chassis or the chassis sub-assemblies, and the trim have not yet been added to the car body construction. By attaching the lower rail 2 to the floor structure 3 integrated in the body-in-white structure of the vehicle V, a secure attachment of the lower rail 2 is accomplished. Non-illustrated additional fastening brackets or similar arrangements may for example be used for the attachment of the lower rail 2 to the floor structure 3, where screw fasteners or similar fastening devices can be used for a firm and secure attachment of the lower rail 2 to the floor structure 3 via the fastening brackets.

The upper rail 1 has an elongated shape and comprises a first side section 8a and a second side section 8b, as shown in FIGS. 4A-4B and 5A-5B. The side sections are suitably joined to each other with appropriate fastening means. The first side section 8a and the second side section 8b may be formed as sheet structures that are forming the upper rail 1 when attached to each other, for example by welding. The upper rail 1 may thus be made of the two joined sheet structures, and the first side section 8a and the second side section 8b constitute lateral sides of the upper rail 1.

A cavity 7 is formed between the first side section 8a and the second side section 8b in a lower portion 1a of the upper rail 1, as shown in for example FIGS. 4A-4B and 5A-5B. The lower portion 1a of the upper rail 1 suitably has a bell-shaped cross-sectional configuration, or a bell-shape like cross-sectional configuration. The first side section 8a comprises a lateral inwardly projecting first flange 9a and the second side section 8b comprises a lateral inwardly projecting second flange 9b. The first flange 9a and the second flange 9b are forming a lower end 11 of the lower portion 1a. The first side section 8a and the second side section 8b are together with the first flange 9a and the second flange 9b forming the cavity 7.

The upper rail 1 is further provided with upper fastening portions 18 for attaching the vehicle seat 4 to the upper rail 1, as shown in for example FIGS. 4A-4B and 5A-5B. The fastening portions 18 may be arranged as openings that suitably are provided with threads for receiving a threaded fastening element for attaching the vehicle seat 4 to the upper rail. The vehicle seat 4 may be arranged with brackets or similar structures for the attachment to the upper rail 1 and engagement with the fastening element.

The stationary lower rail 2 has an extension in the longitudinal vehicle direction $D_{LO}$ when attached to the floor structure 3 of the vehicle V, as illustrated in for example FIG. 2. The seat rail system S further comprises an elongated load member 5 attached to the lower rail 2, as shown in for example FIGS. 3, 4A-4B, 5A-5B, and 7. The load member 5 comprises an upper part 5a and one or more lower parts 5b. In the illustrated embodiment the upper part 5a is extending along the length of the load member 5, and a plurality of lower parts 5b are arranged in connection to the upper part 5a in a spaced apart configuration, as understood from for example FIG. 3. The upper part 5a of the load member 5 has an upper T-shaped cross-sectional configuration with a laterally extending upper flange 6a, as shown in FIGS. 4A-4B and 5A-5B. The one or more lower parts 5b of the load member 5 have lower T-shaped cross-sectional configurations with a laterally extending lower flange 6b, as shown in FIGS. 4A-4B, 5A-5B, and 7. A web section 5c of the load member 5 is connecting the upper flange 6a and the lower flange 6b. With a T-shaped cross-sectional configuration is meant a cross-sectional shape having a T-shape, or a shape similar to a T-shape such as the double hook like configuration shown in FIGS. 4A-4B and 5A-5B. The cross-sectional configuration of the load member 5 where the upper part 5a and the lower parts 5b correspond to each other is similar to an I-beam structure, or similar to an I-beam like structure, as shown in FIGS. 4A-4B and 5A-5B.

Figure 3:
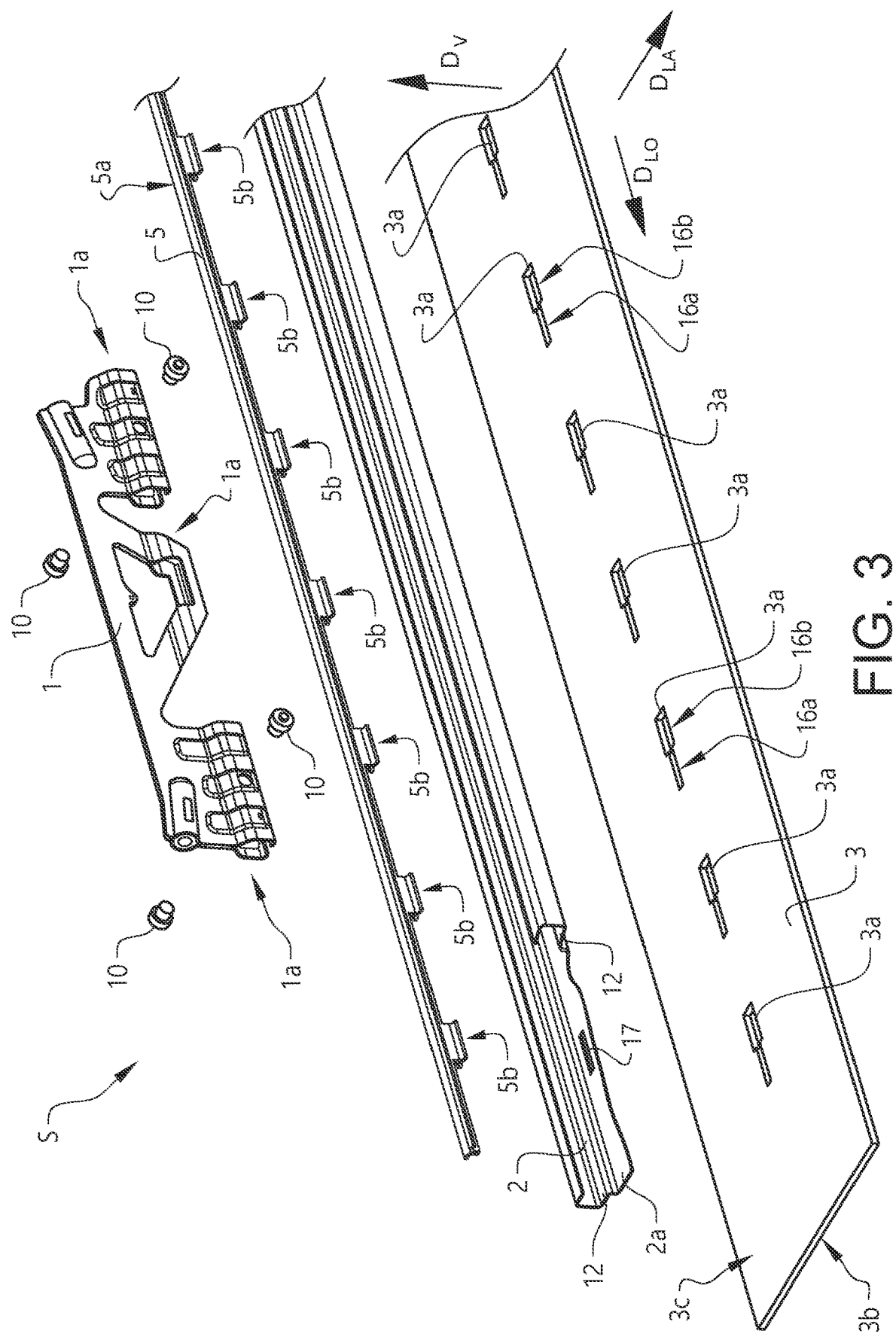
FIG. 3 shows schematically, in an exploded perspective view, the seat rail system, according to the disclosure.
Figure 7:
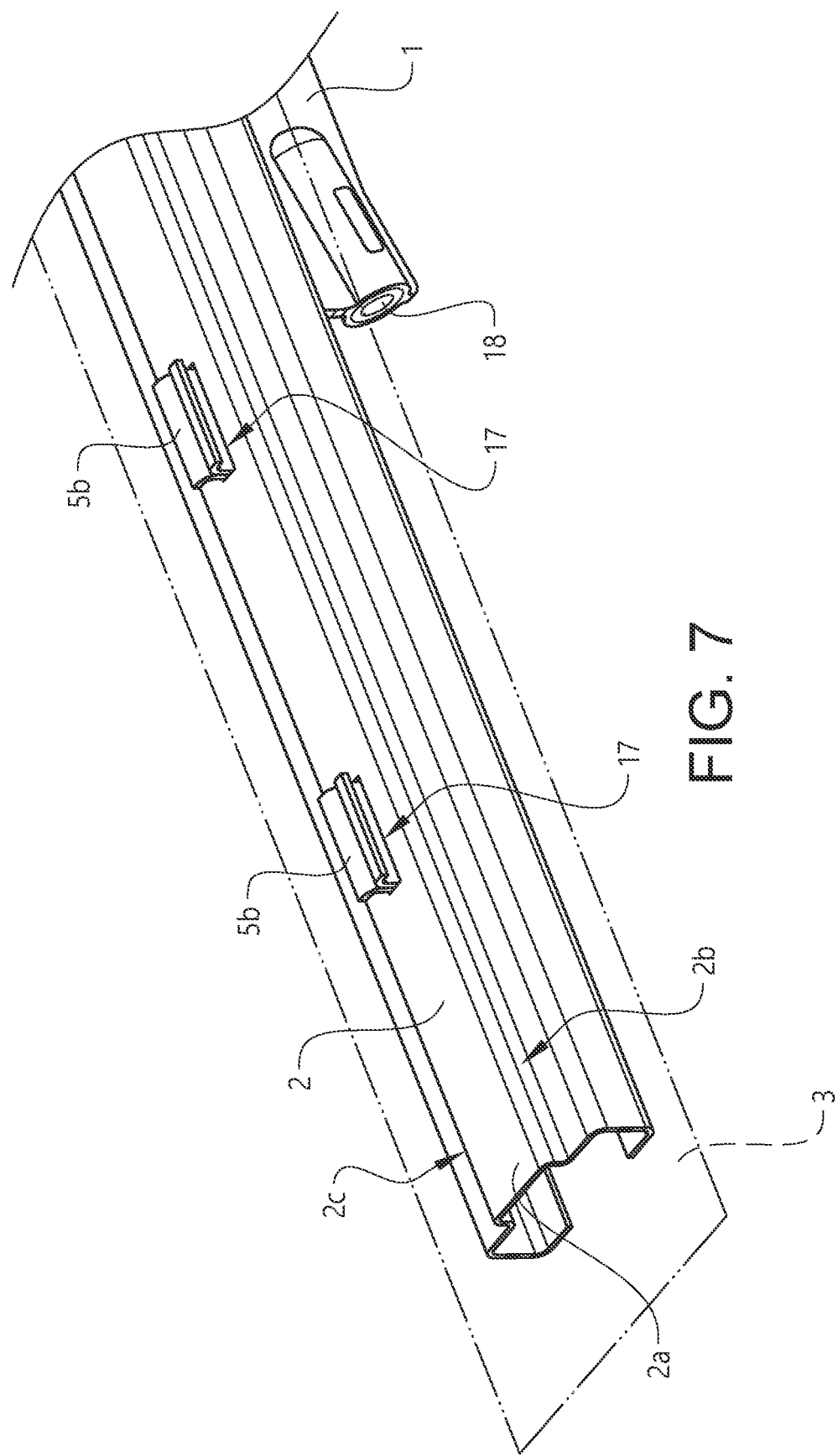
FIG. 7 shows schematically, in a perspective view from below, the lower rail of the seat rail system and the floor structure, according to the disclosure.

As shown in FIGS. 3 and 7, a lower section 2a of the lower rail 2 is arranged with a plurality of rail openings 17 arranged for receiving the plurality of lower parts 5b. The lower parts 5b are suitably positioned through corresponding rail openings 17 when mounting the load member 5 to the lower rail 2, and thereafter the lower parts 5b could be bent into the lower T-shaped cross-sectional configurations, as understood from FIG. 7. In this way, one or more lower parts 5b of the load member 5 are extending through the lower section 2a of the lower rail 2. The load member 5 and the lower rail 2 are made of suitable materials having high strength, as for example high-strength steel, polymers, composite materials, or other suitable materials or combinations of materials. The load member 5 is attached to the lower rail 2 with suitable fastening means, such as for example welds, glue, rivets, or screw fasteners.

In the illustrated embodiment, the load member 5 comprises two joined material sections 5:1,5:2 forming the upper and lower T-shaped cross-sectional configurations with the web section 5c in-between. The material sections 5:1,5:2 each at least partly has a U-shape, or U-shape like, cross-sectional configuration, as shown in FIGS. 4A-4B and 5A-5B. This construction with the two joined material sections may simplify the mounting or assembling of the load member 5 to the lower rail 2, since each of the sections can be positioned into the rail openings 17 and thereafter attached to each other and to the lower rail 2. Also with this configuration, the one or more lower parts 5b of the load member 5 are extending through the lower section 2a.

The cavity 7 of the upper rail 1 is configured for embracing the upper part 5a with the upper flange 6a of the load member 5. As shown in FIGS. 4A-4B and 5A-5B, the first flange 9a and the second flange 9b are arranged below the upper flange 6a, and with this configuration, the first flange 9a and the second flange 9b are extending in inwards directions towards the load member 5. The first side section 8a and the second side section 8b are together with the first flange 9a and the second flange 9b forming the cavity 7, which is embracing the upper flange 6a of the load member 5.

Thus, in an assembled state of the seat rail system S, as shown in for example FIGS. 4A-4B and 5A-5B, the upper part 5a of the load member 5 is extending into the cavity 7 in the lower portion 1a of the upper rail 1.

As understood from for example FIG. 3, the lower portion 1a of the upper rail 1 may be sectioned into more than one structural part for receiving the upper part 5a of the load member 5. In the illustrated embodiment, the upper rail 1 is arranged with three sections that together are forming the lower portion 1a, and the upper part 5a of the load member 5 is extending into all three sections forming the lower portion 1a. The three sections forming the lower portion 1a are all embracing the upper flange 6a of the load member 5.

The load member 5 is configured for being directly in engagement with the floor structure 3 and the lower portion 1a in a vehicle impact event for establishing a load path from the floor structure 3 to the upper rail 1 via the load member 5. With a vehicle impact event is meant any situation where the vehicle V is exposed to impact forces, such as when the vehicle V is hitting an object or an object is hitting the vehicle V. Typical vehicle impact events are when the vehicle V is involved in a crash situation or collision, for example with another vehicle, or if the vehicle V leaves a roadway in a run-off-road collision or similar event. If the vehicle V is involved in a collision, impact forces will act on the vehicle seat 4 and the seat rail system S.

In a head-on collision, or in a collision where the front end of the vehicle V runs into an object, the front part of the upper rail 1 is pushed downwards towards the second rail 2 by a pushing force $F_{PUSH}$ and the rear part of the upper rail 1 is pulled in a direction upwards away from the second rail 2 by the pulling force $F_{PULL}$, due to the forces acting on the vehicle seat 4 causing a rotational movement. In a rear-end collision, or in a collision where the rear end of the vehicle V runs into an object, the front part of the upper rail 1 is pulled in a direction upwards away from the second rail 2 by a pulling force $F_{PULL}$ and the rear part of the upper rail 1 is pushed downwards towards the second rail 2 by a pushing force $F_{PUSH}$, due to the forces acting on the vehicle seat 4 causing a rotational movement. The pushing force $F_{PUSH}$ and the pulling force $F_{PULL}$ are schematically illustrated in FIG. 2.

The strength of the seat rail system S is critical when a pulling force $F_{PULL}$ is acting on the upper rail 1, such as in the vehicle impact events described above. The pulling force $F_{PULL}$ is illustrated with an arrow in FIGS. 4B and 5B, indicating that a part of the upper rail 1 is pulled in a direction upwards away from the second rail 2. When the pulling force $F_{PULL}$ is acting on a part of the seat rail system S, the load member 5 has the function to directly engage the floor structure 3 and directly engage the upper rail 1. In this way, the floor structure 3 is connected to the upper rail 1 via the load member 5 for establishing the load path from the floor structure 3 to the upper rail 1 via the load member 5. The load member 5 is establishing a strong and robust construction of the seat rail system S that is preventing large and unwanted deformations of the rails. With the system configuration, the load member 5 is directly in engagement with both the floor structure 3 and the lower portion 1a in the vehicle impact event. The established load path in the vehicle impact event from the floor structure 3 to the upper rail 1 via the load member 5, is through the engagement of the load member 5 following a centre line C of seat rail system S from the floor structure 3 to the upper rail for establishing a short load path compared to traditional systems, as indicated in FIGS. 4B and 5B.

The upper flange 6a comprises a first flange section 13a and a second flange section 13b. The first flange section 13a and the second flange section 13b are extending laterally on opposite sides of the web section 5c, as shown in FIGS. 4A-4B and 5A-5B. In the assembled state of the seat rail system S, the first flange 9a is arranged below the first flange section 13a and the second flange 9b is arranged below the second flange section 13b. The first flange 9a is configured for being in engagement with the first flange section 13a in the vehicle impact event, and the second flange 9b is configured for being in engagement with the second flange section 13b in the vehicle impact event, as will be further described below in connection to FIGS. 4B and 5B. In the illustrated embodiment, the first flange 9a is extending inwards towards the load member 5 from the first side section 8a with an upwards inclined configuration, and the second flange 9b is extending inwards towards the load member 5 from the second side section 8b with an upwards inclined configuration. The first flange section 13a is extending outwards towards the first side section 8a from the web section 5c with a downwards inclined configuration, and the second flange section 13b is extending outwards towards the second side section 8b from the web section 5c with a downwards inclined configuration.

In FIGS. 4A and 5A, the seat rail system S is illustrated in an unloaded state $S_U$, and the seat rail system S is in the unloaded state used in normal operating conditions, such as when a user is seated in the vehicle seat 4, or when adjusting the vehicle seat 4. In FIGS. 4B and 5B, the seat rail system S is illustrated in a loaded state $S_L$, and the loaded state is occurring in the vehicle impact event when a pulling force $F_{PULL}$ is acting on parts of the seat rail system S, as will be further described below.

As shown in the embodiments illustrated in FIGS. 4A and 5A, the first flange section 13a has an extension parallel to, or essentially parallel to, the extension of the first flange 9a in the unloaded state $S_U$. The second flange section 13b has an extension parallel to, or essentially parallel to, the extension of the second flange 9b in the unloaded state $S_U$. The parallel extensions are simplifying secure interaction between the respective flange sections and the first and second flanges.

More specifically, the upper flange 6a is configured for being in engagement with the lower portion 1a of the upper rail 1 in the vehicle impact event. The first flange 9a is engaging the first flange section 13a in the vehicle impact event, and the second flange 9b is engaging the second flange section 13b in the vehicle impact event for a strong connection between the upper rail 1 and the load member 5. In this way, the first flange 9a and the second flange 9b are configured for being in engagement with the upper flange 6a. As understood from FIGS. 4B and 5B, the parts involved are arranged as hook-like elements that are interacting with each other in the vehicle impact event, preventing that the upper rail 1 is separated from the lower rail 2 due to the connection of the load member 5 to the lower portion 1a. In the vehicle impact event, the upper rail 1 is pulled a small distance upwards away from the lower rail 2 due to minimal play between parts involved. As shown in FIGS. 4A and 5A, there is a small play between the upper flange 6a and the respective first flange 9a and the second flange 9b in normal operating conditions, which is allowing the movement of the upper rail 1 in relation to the lower rail 2 in the longitudinal vehicle direction $D_{LO}$ for the positioning of the vehicle seat 4 relative to the floor structure 3.

In a similar way, the one or more lower parts 5b of the load member 5 are configured for being in engagement with the lower surface 3b of the floor structure 3 in the vehicle impact event. The lower flange 6b is engaging the lower surface 3b of the floor structure 3 in the vehicle impact event for a strong connection between the floor structure 3 and the load member 5. As understood from FIGS. 4B and 5B, the lower flange 6b is interacting with the floor structure 3 preventing that the lower rail 2 is separated from the floor structure 3. As shown in FIGS. 4A-4B and 5A-5B, the lower flanges 6b of the lower parts 5b are arranged as hook-like elements that are interacting with the floor structure 3 in the vehicle impact event, preventing that the lower rail 2 is separated from the floor structure 3 due to the connection of the load member 5 to the floor structure 3. In the vehicle impact event, the lower rail 2 may be pulled a small distance upwards away from the floor structure due to a small play between the lower flange 6b and the lower surface 3b of the floor structure 3. The small play between the lower flange 6a and the lower surface 3b of the floor structure 3 in normal operating conditions is allowing mounting of the lower rail 2 to the floor structure 3, as described below.

As illustrated in FIGS. 4A-4B and 5A-5B, the lower rail 2 comprises a first lateral side element 2b and a second lateral side element 2c. The first lateral side element 2b and the second lateral side element 2c are each extending in an upwards direction from the lower section 2a of the lower rail. The first lateral side element 2b and the second lateral side element 2c are extending from the lower section 2a on opposite sides of the load member 5. The first lateral side element 2b is arranged in connection to and in an overlapping relationship to the first side section 8a in the vertical vehicle direction $D_V$, as shown in for example FIGS. 4A and 5A. The second lateral side element 2c is arranged in connection to and in an overlapping relationship to the second side section 8b in the vertical vehicle direction $D_V$, as shown in for example FIGS. 4A and 5A. With the overlapping configuration between the first lateral side element 2b and the first side section 8a in the vertical direction $D_V$, the first lateral side element 2b is configured for blocking lateral movement of the first side section 8a upon deformation of the upper rail 1 in the vehicle impact event, as shown in FIGS. 4B and 5B. With the overlapping configuration between the second lateral side element 2c and the second side section 8b in the vertical direction $D_V$, the second lateral side element 2c is configured for blocking lateral movement of the second side section 8b upon deformation of the upper rail 1 in the vehicle impact event, as shown in FIGS. 4B and 5B.

In the embodiment illustrated in FIGS. 4A-4B, the first lateral side element 2b is extending from the lower section 2a in a direction parallel to, or essentially parallel to the vertical vehicle direction $D_V$, and the second lateral side element 2c is extending from the lower section 2a in a direction parallel to, or essentially parallel to the vertical vehicle direction $D_V$. In the alternative embodiment illustrated in FIGS. 5A-5B, the first lateral side element 2b is extending upwards from the lower section 2a towards the load member 5 with an inwards inclined configuration, and the second lateral side element 2c is extending upwards from the lower section 2a towards the load member 5 with an inwards inclined configuration. This alternative design may be used for an increased system strength. In the embodiments illustrated in FIGS. 4A-4B and 5A-5B the lateral side elements are arranged as side walls of the lower rail 2. It should however be understood that the lateral side elements may have other suitable designs and configurations, such as for example other types of continuous or discrete elements forming part of the lower rail 2, and arranged in the overlapping configuration for blocking lateral movement of the respective side sections.

As shown in FIGS. 4A-4B and 5A-5B, the one or more lower parts 5b of the load member 5 are extending through corresponding openings 3a of the floor structure 3. In this way, the one or more lower parts 5b of the load member 5 are connected to the floor structure 3. The positions of the openings 3a are coinciding with the spacing of the lower parts 5b along the load member 5, as understood from FIGS. 3 and 7. The openings 3a have narrowing configurations, and the openings 3a are tapering in the longitudinal vehicle direction $D_{LO}$. Suitable narrowing shapes are for example keyhole like shapes as illustrated in FIG. 3. However, any suitable narrowing shape may be used. The openings 3a in the illustrated embodiment are provided with narrow sections 16a and wide sections 16b.

The wide sections 16b of the openings 3a have suitable sizes for receiving the lower parts 5b, and the lower parts 5b with the lower flange 6b are inserted into the wide sections 16b when mounting the lower rail 2 with the load member 5 to the floor structure 3, as illustrated in FIG. 6A. The lower parts 5a are entering the wide sections 16b in a downwards movement of the lower rail 2, as indicated with arrows in FIG. 6A. When inserted into the openings 3a, the lower parts 5b are extending through the floor structure 3 and the lower flanges 6b are positioned below the floor structure 3, as illustrated in FIG. 6B. To complete the mounting of the lower rail 2 to the floor structure 3, the lower rail 2 is after insertion into the wide sections 16b pushed in a direction towards the narrow sections 16a, as indicated with arrows in FIG. 6B. By pushing the lower rail 2 in the direction towards the narrow sections 16a, the lower flanges 6b will be positioned below the floor structure 3 into a final mounting position, as shown in FIG. 6C. When the lower flanges 6b are positioned below the floor structure 3 within the narrow sections 16a, the lower rail 2 is prevented from being displaced in an upwards direction due to engagement between the lower flanges 6b and the lower surface 3b of the floor structure 3, as understood from FIGS. 4B and 5B. The second rail 2 may be further attached to the floor structure 3 via the non-illustrated fastening brackets, as described above. When the lower rail 2 is attached to the floor structure 3, the upper rail 1 and the vehicle seat 4 may be mounted to the lower rail 2.

The seat rail system S further comprises laterally extending bearing structures 10, as shown in for example FIGS. 3, 4A-4B, and 5A-5B. The bearing structures 10 are attached to the upper rail 1, and the bearing structures 10 are extending laterally in opposite directions from the upper rail 1. The bearing structures 10 may be arranged pairwise on opposite sides of the upper rail. The bearing structures 10 are configured for movably engaging the lower rail 2 and for providing a low-friction engagement between the upper rail 1 and the lower rail 2. The bearing structures 10 comprise bearings 10a, and the bearings 10a are suitably connected to the upper rail 1 via extending shaft structures 10b or similar arrangements for lateral positioning of the bearings 10a in relation to the lower rail 2.

The lower rail 2 comprises two bearing surfaces 12 laterally arranged on opposite sides of the load member 5, as shown in for example FIGS. 4A-4B and 5A-5B. The bearings 10a and the bearing surfaces 12 are configured for interacting with each other when the upper rail 1 is displaced in relation to the lower rail 2. In the embodiment illustrated in FIG. 3, the first rail 1 comprises two pairs of bearing structures 10 arranged for interacting with the bearing surfaces 12. However, any suitable number of bearing structures 10 may be used. The bearings 10a may for example be roller bearings and the roller bearings may be provided with wheel elements or similar structures for rolling interaction with the bearing surfaces 12 upon longitudinal displacement of the upper rail 1 in relation to the lower rail 2. The bearings 10a may alternatively be sliding bearings for sliding interaction with the bearing surfaces 12 upon longitudinal displacement of the upper rail 1 in relation to the lower rail 2. Other types of bearings may also be used depending on the construction and design of the system. The bearing structures 10 are as illustrated in FIGS. 4A-4B and 5A-5B positioned above the lower end 11 of the lower portion 1a of the upper rail 1 for a compact and robust construction of the system.

Figure 8:
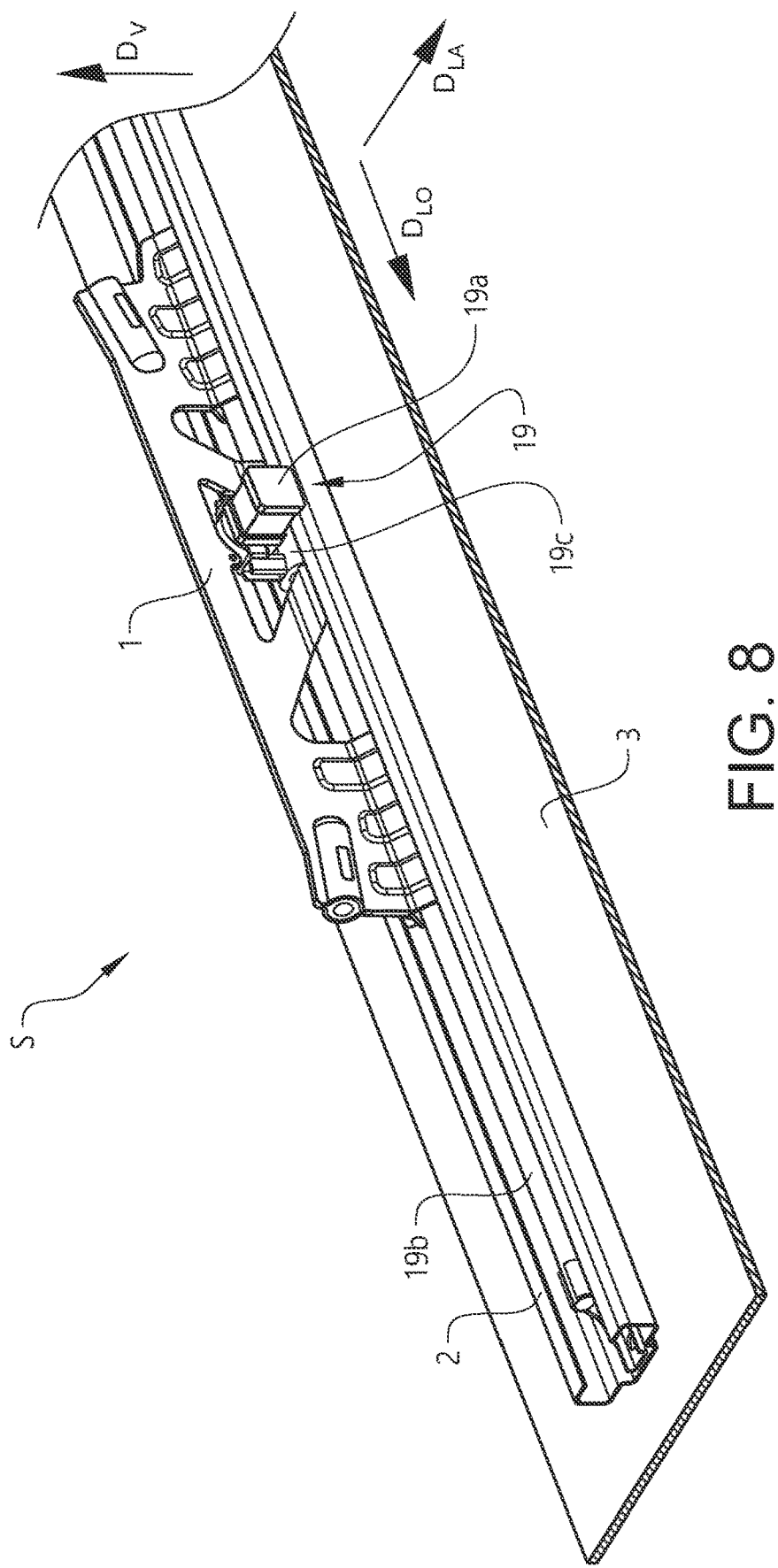
FIG. 8 shows schematically, in a perspective view from above, the seat rail system with a drive mechanism, according to the disclosure.

As illustrated in FIG. 8, the seat rail system S may further be provided with a drive mechanism 19 for positioning the upper rail 1 in relation to the lower rail 2. The drive mechanism may comprise an electric motor 19a and be configured as a worm drive mechanism. The worm drive mechanism may comprise an elongated threaded rod 19b connected to the lower rail 2 that is interacting with a worm gear 19c arranged on the upper rail 1. It should be understood that the drive mechanism 19 could have other suitable constructions, such as for example a linear actuator or ball screw mechanism.

In the vehicle event when a pulling force $F_{PULL}$ is acting on at least a part of the upper rail 1, the part of the upper rail 1 is displaced in an upwards direction and moved from the unloaded state $S_U$ to the loaded state $S_L$, as shown in FIGS. 4A-4B and 5A-5B. Upon displacement of the upper rail 1 in the upwards direction in the vehicle impact event, the first flange 9a is engaging the first flange section 13a, and the second flange 9b is engaging the second flange section 13b for a strong connection between the upper rail 1 and the load member 5. The engagement of the first and second flanges with the respective flange sections is displacing the load member 5 upwards, wherein the lower flange 6b is engaging the lower surface 3b of the floor structure 3 in the vehicle impact event for a strong connection between the floor structure 3 and the load member 5. The engagement of the first and second flanges with the respective flange sections is further deforming the first side section 8a and the second side section 8b, and the deformation is displacing the first side section 8a and the second side section 8b laterally outwards away from the load member 5, as understood from FIGS. 4B and 5B. However, with the overlapping configuration between the first lateral side element 2b and the first side section 8a in the vertical direction $D_V$, the first lateral side element 2b is blocking the lateral movement of the first side section 8a upon deformation of the first side section 8a. With the overlapping configuration between the second lateral side element 2c and the second side section 8b in the vertical direction $D_V$, the second lateral side element 2c is blocking lateral movement of the second side section 8b upon deformation of the second side section 8b. The blocked lateral movements are thus preventing large deformations of the respective side sections for a strong connection of the upper rail 1 to the floor structure 3. As shown in FIGS. 4B and 5B, the first side section 8a is upon deformation brought into contact with the first lateral side element 2b in a first contact area $A_{C1}$ in the vehicle impact event for blocking the lateral movement, and the second side section 8b is upon deformation brought into contact with the second lateral side element 2c in a second contact area $A_{C2}$ in the vehicle impact event for blocking the lateral movement. The blocking of the lateral movements of the first side section 8a and the second side section 8b in combination with the engagement of the load member 5 with the floor structure 3 and the upper rail 1 is securing a straight symmetrical load path all the way from the floor structure 3 to the vehicle seat 4 via the upper rail 1. The established load path in the vehicle impact event from the floor structure 3 to the upper rail 1 via the load member 5, is through the engagement of the load member 5 following the centre line C of the seat rail system S from the floor structure 3 to the upper rail 1.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure or as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Upper rail
1a: Lower portion
2: Lower rail
2a: Lower section

2b: First lateral side element
2c: Second lateral side element
3: Floor structure
3a: Opening
3b: Lower surface
3c: Upper surface
4: Vehicle seat
5: Load member
5a: Upper part
5b: Lower part
5c: Web section
6a: Upper flange
6b: Lower flange
7: Cavity
8a: First side section
8b: Second side section
9a: First flange
9b: Second flange
10: Bearing structure
10a: Bearing
10b: Shaft structures
11: Lower end
12: Bearing surface
13a: First flange section
13b: Second flange section
16a: Narrow section
16b: Wide section
17: Rail opening
18: Fastening portions
19: Drive mechanism
19a: Electric motor
19b: Threaded rod
19c: Worm gear
$A_{C1}$: First contact area
$A_{C2}$: Second contact area
C: Centre line
$D_{LA}$: Lateral vehicle direction
$D_{LO}$: Longitudinal vehicle direction
$D_V$: Vertical vehicle direction
$F_{PULL}$: Pulling force
$F_{PUSH}$: Pushing force
S: Seat rail system
$S_L$: Loaded state
$S_U$: Unloaded state
V: Vehicle

What is claimed is:

1. A seat rail system for a vehicle, wherein the seat rail system comprises an upper rail and a stationary lower rail attached to a floor structure of the vehicle, wherein the upper rail is configured for being attached to a vehicle seat, wherein the upper rail is movably arranged in relation to the lower rail in a longitudinal vehicle direction, wherein the upper rail comprises a first side section and a second side section, wherein a cavity is formed between the first side section and the second side section in a lower portion, wherein the lower rail comprises a first lateral side element arranged in connection to and in an overlapping relationship to the first side section and a second lateral side element arranged in connection to and in an overlapping relationship to the second side section, wherein the seat rail system further comprises an elongated load member attached to the lower rail, wherein an upper part of the load member is extending into the cavity,
wherein one or more lower parts of the load member are connected to the floor structure, and wherein the first lateral side element is configured for blocking lateral movement of the first side section and the second lateral side element is configured for blocking lateral movement of the second side section upon deformation of the upper rail in a vehicle impact event.

2. The seat rail system according to claim 1, wherein the one or more lower parts of the load member are extending through the floor structure, wherein the load member is configured for being directly in engagement with the floor structure and the lower portion in the vehicle impact event for establishing a load path from the floor structure to the upper rail via the load member.

3. The seat rail system according to claim 1, wherein the lower portion of the upper rail has a bell-shaped cross-sectional configuration forming the cavity between the first side section and the second side section, wherein the cavity is configured for embracing the upper part.

4. The seat rail system according to claim 1, wherein the upper part of the load member has an upper T-shaped cross-sectional configuration with a laterally extending upper flange, wherein the upper flange comprises a first flange section and a second flange section laterally extending on opposite sides of a web section, wherein the first side section comprises a lateral inwardly projecting first flange and the second side section comprises a lateral inwardly projecting second flange, wherein the first flange is arranged below the first flange section and configured for being in engagement with the first flange section in the vehicle impact event, wherein the second flange is arranged below the second flange section and configured for being in engagement with the second flange section in the vehicle impact event.

5. The seat rail system according to claim 4, wherein the first flange is extending inwards towards the load member from the first side section with an upwards inclined configuration, and wherein the second flange is extending inwards towards the load member from the second side section with an upwards inclined configuration.

6. The seat rail system according to claim 4, wherein the first flange section is extending outwards towards the first side section from the web section with a downwards inclined configuration, wherein the second flange section is extending outwards towards the second side section from the web section with a downwards inclined configuration.

7. The seat rail system according to claim 4, wherein the first flange section has an extension parallel to, or essentially parallel to, the extension of the first flange in an unloaded state, and wherein the second flange section has an extension parallel to, or essentially parallel to, the extension of the second flange in the unloaded state.

8. The seat rail system according to claim 1, wherein the lower rail comprises a lower section, wherein the one or more lower parts of the load member are extending through the lower section, wherein the first lateral side element and the second lateral side element are extending upwards from the lower section on opposite sides of the load member.

9. The seat rail system according to claim 8, wherein the first lateral side element is extending from the lower section towards the load member with an inwards inclined configuration, and wherein the second lateral side element is extending from the lower section towards the load member with an inwards inclined configuration.

10. The seat rail system according to claim 1, wherein the one or more lower parts of the load member are extending though corresponding openings of the floor structure.

11. The seat rail system according to claim 1, wherein the one or more lower parts of the load member are configured for being in engagement with a lower surface of the floor structure in the vehicle impact event.

12. The seat rail system according to claim 1, wherein the one or more lower parts of the load member have lower T-shaped cross-sectional configurations with a laterally extending lower flange, wherein the lower flange is configured for being in engagement with the floor structure in the vehicle impact event.

13. The seat rail system according to claim 1, wherein the seat rail system further comprises laterally extending bearing structures, wherein the bearing structures are attached to the upper rail and extending in opposite directions from the upper rail, wherein the bearing structures are configured for movably engaging the lower rail.

14. The seat rail system according to claim 1, wherein the floor structure is an integrated structural part of a body-in-white structure of the vehicle.

15. A vehicle comprising the seat rail system according to claim 1.

* * * * *